United States Patent [19]

Keane

[11] Patent Number: 4,530,543

[45] Date of Patent: Jul. 23, 1985

[54] PLASTIC WHEEL HAVING AN ANNULAR BEARING SUPPORT

[75] Inventor: James W. Keane, White Bear Lake, Minn.

[73] Assignee: Whirlpool Corporation, Benton Harbor, Mich.

[21] Appl. No.: 535,982

[22] Filed: Sep. 26, 1983

[51] Int. Cl.³ ............................ B60B 1/06; B60B 9/10
[52] U.S. Cl. ..................... 301/63 PW; 301/109; 301/125; 16/45
[58] Field of Search ............ 301/63 PW, 64 R, 109, 301/110, 124 R, 125, 5.3, 5.7, 7, 1; 16/45, 46, DIG. 40; 403/70, 71; 446/95, 102, 103

[56] References Cited

U.S. PATENT DOCUMENTS

| | | |
|---|---|---|
| 1,338,356 | 4/1920 | Cantelo . |
| 2,272,476 | 2/1942 | Parrish ................................. 15/41 |
| 2,878,074 | 3/1959 | Cawl .................................... 301/63 |
| 3,164,418 | 1/1965 | Biesecker .......................... 308/3.8 |
| 3,236,004 | 2/1966 | Christiansen ..................... 446/102 |
| 3,248,154 | 4/1966 | Waters et al. ........................ 301/1 |
| 3,473,259 | 10/1969 | Carter .................................. 46/211 |
| 3,907,370 | 9/1975 | Bard ........................... 301/63 PW X |
| 3,928,888 | 12/1975 | Lapham ............................. 16/35 R |
| 3,991,434 | 11/1976 | James ................................ 16/18 A |
| 4,057,872 | 11/1977 | Schmidt ................................. 16/29 |
| 4,164,251 | 8/1979 | Chung ...................... 301/63 PW X |
| 4,229,855 | 10/1980 | Rowe ..................................... 16/29 |

FOREIGN PATENT DOCUMENTS 2634020 3/1977 Fed. Rep. of Germany .......... 16/45

Primary Examiner—David A. Scherbel
Assistant Examiner—Mark J. Abate
Attorney, Agent, or Firm—Wood, Dalton, Phillips, Mason & Rowe

[57] ABSTRACT

A wheeled support structure for use in a vacuum cleaner or the like. The wheeled support structure includes a wheel mount on the body of the vacuum cleaner defining an outwardly opening recess having an inwardly facing lock surface. The wheel mount further defines a fixed annular bearing surface coaxially of the recess and spaced radially outwardly therefrom for journaling the wheeled support slidably concentrically mounted thereon. The wheel further includes a latch element extending inwardly through the recess and having turned latch shoulders arranged to be disposed inwardly of the lock surface for preventing axially outward removal of the latch element, thereby maintaining the wheel mounting surface slidably mounted on the bearing surface of the vacuum cleaner support wall.

14 Claims, 4 Drawing Figures

U.S. Patent    Jul. 23, 1985    4,530,543
FIG. 1
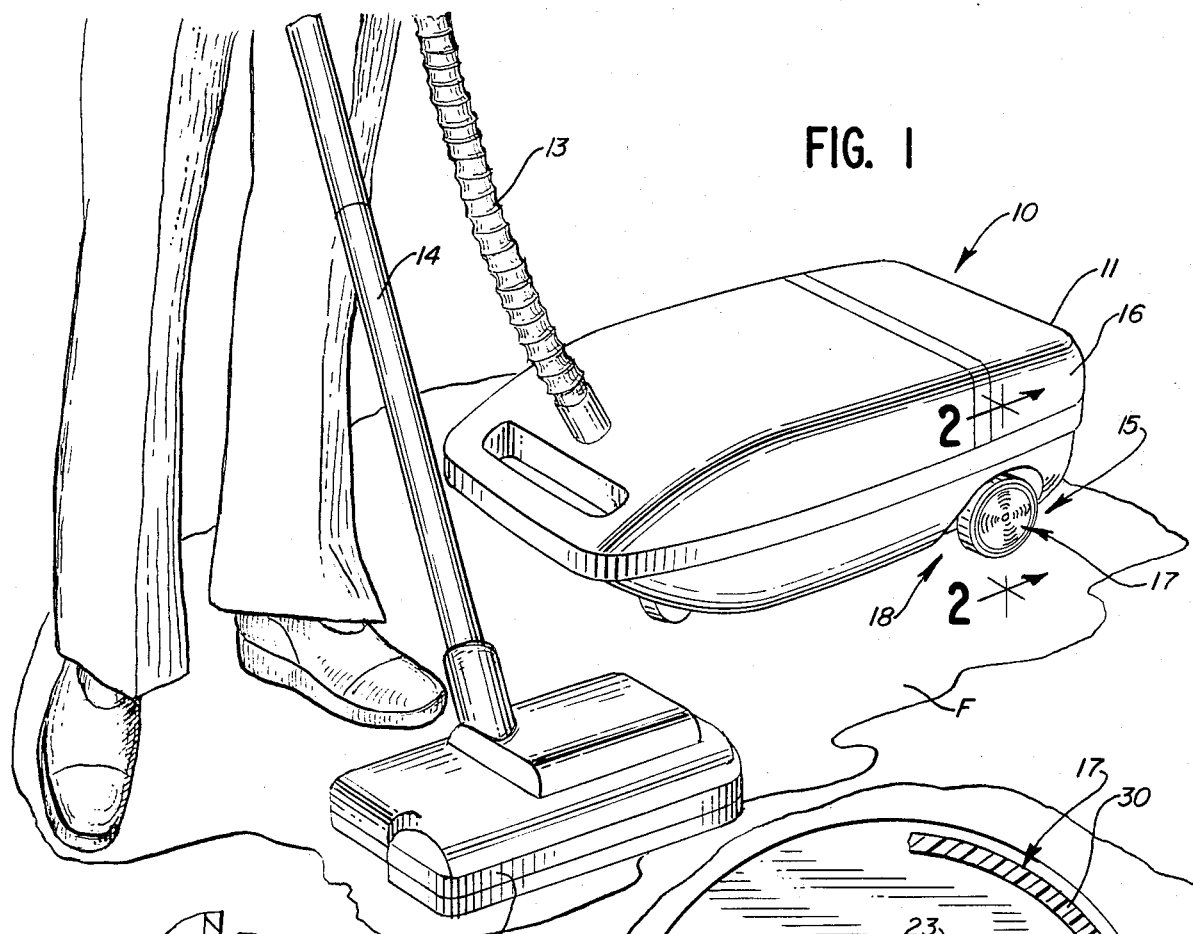
FIG. 2
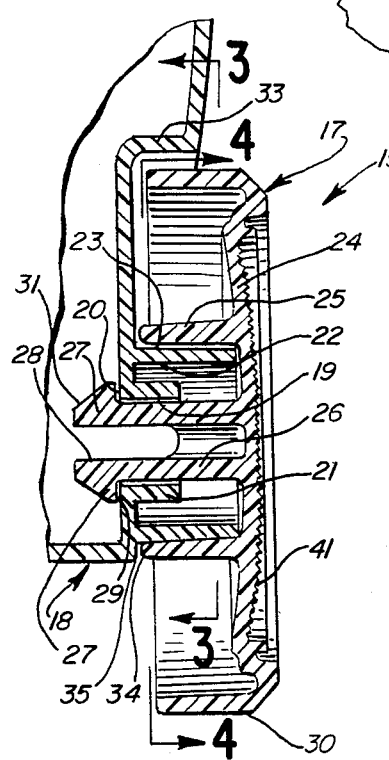
FIG. 3
FIG. 4
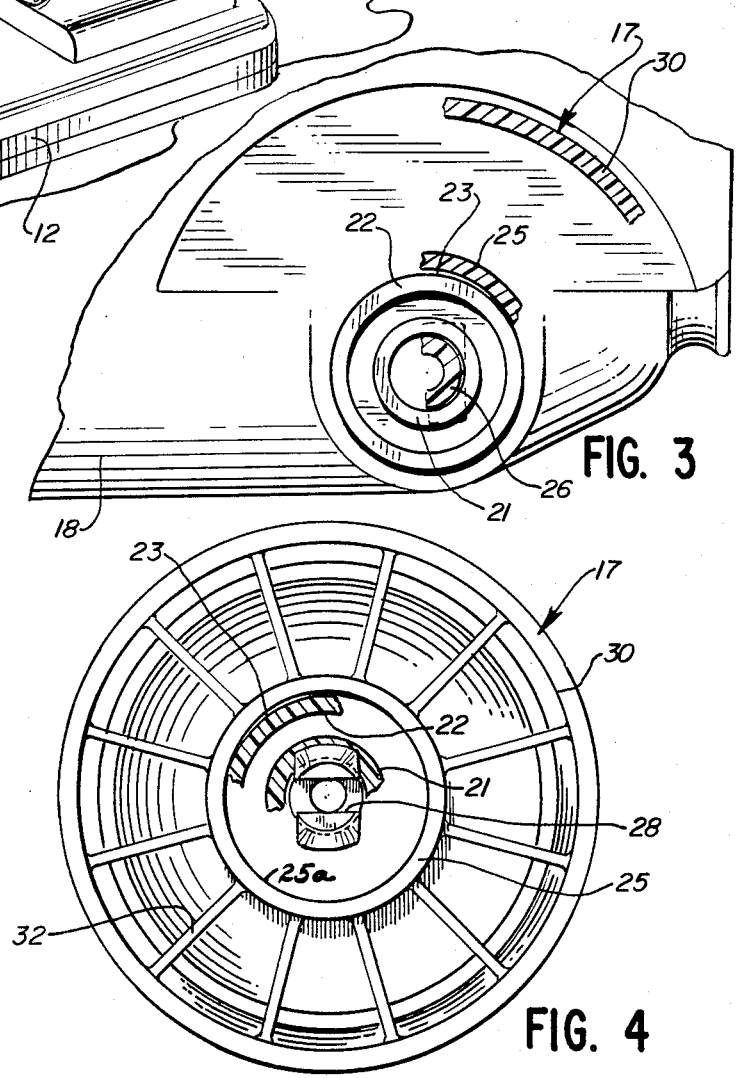

PLASTIC WHEEL HAVING AN ANNULAR BEARING SUPPORT

BACKGROUND OF THE INVENTION

1. Field of the Invention

This invention relates to vacuum cleaners and the like and, in particular, to wheeled support structures for use therein.

2. Description of the Background Art

It is conventional in vacuum cleaner apparatus to provide wheeled support structures permitting movement of the vacuum cleaner apparatus over the floor surface to be cleaned. In one form of vacuum cleaner apparatus, the suction means is provided in a wheeled canister and suction is applied therefrom through a flexible hose connected to a wheeled nozzle adapted to be moved over the surface of the floor. To facilitate manufacture and minimize cost, it has been conventional to utilize snap-on fastening wheels, such as providing the wheeled mount of the canister body. It has been conventional to form such wheels of a relatively high modulus, stiff material, such as ABS synthetic resin (acrylonitrile-butadienestyrene).

Such relatively hard wheel material is satisfactory for use on vacuum cleaners which are moved to-and-fro over carpeted floors only. However, when the vacuum cleaner is used for bare floor cleaning as well as carpet cleaning, as is usually the case, it is desirable to form the wheels out of a relatively soft, low elastic modulus material, i.e. one having relatively low stiffness so as to avoid scratching of the bare floor surfaces by the wheels. However, heretofore wheels made from such relatively soft low elastic modulus synthetic resins such as polypropylene did not have the desired strength and other physical characteristics to permit use thereof in a snap-fitted wheeled structure.

One example of a caster formed of synthetic resin is that illustrated in U.S. Pat. No. 3,928,888 of Sidney D. Lapham. As shown therein, the support disc is provided with a tapered bearing element which supports a portion of the weight of the element carried thereby. Additionally, an annular bearing surface is provided for further supporting the load. The periphery of the disc is further supported by a wheel rotatable about a horizontal axis.

In U.S. Pat. No. 3,991,434 of Michael J. James, a ball caster is provided wherein an axle is provided on the body structure, with the wheel defining a female hub element rotatably journaled on the body axle.

In U.S. Pat. No. 1,338,356, of John S. Cantelo, there is shown a caster having the load-bearing support of the wheel at the axle, with clearance between portions of the wheel radially outwardly thereof and the supporting body.

SUMMARY OF THE INVENTION

The present invention comprehends an improved wheeled support structure for use in vacuum cleaners and the like, including a wheel mount on the body of the vacuum cleaner defining an outwardly opening recess having an inwardly facing annular lock surface, and means defining an annular bearing surface coaxially of the recess and spaced radially outwardly therefrom, and a wheel having a resiliently deflectible latch element extending inwardly through the recess and having turned latch shoulder means arranged to be disposed inwardly of the annular lock surface for preventing axially outward removal of the latch element from the recess, and a wheel support spaced radially outwardly from the latch element defining an annular radially inwardly facing mounting surface slidably concentrically carried on the bearing surface.

In the illustrated embodiment, the bearing surface means is fixedly disposed on the wheel mount.

In the illustrated embodiment, the latch shoulder means is segmentally annular.

As shown, the wheel mount structure defining the recessed lock surface and bearing surface comprise a unitary integral structure.

The invention comprehends the wheel be formed of a synthetic resin having a hardness less than that of ABS synthetic resin.

In the illustrated embodiment, the wheel is formed of polypropylene, a material having a relatively low elastic modulus, as compared to the elastic modulus of ABS.

In the illustrated embodiment, the latch element has a preselected clearance with the wheel mount in the recess.

In the illustrated embodiment, the wheel mount recess comprises a through bore.

The wheel mount may be formed integrally with the body and the wheel support may be formed integrally with the wheel.

In the illustrated embodiment, the wheel mount and wheel support define cooperating limit surfaces limiting the inward displacement of the latch element in the recess.

The vacuum cleaner wheeled support structure provides an improved means for wheeled mounting of a vacuum cleaner or the like in minimizing noise during bare floor cleaning and for minimizing marring or scratching of the bare floor surfaces over which the wheeled vacuum cleaner is moved. The improved wheeled support structure is extremely simple and economical of construction while yet providing for facilitated assembly and long, troublefree life.

BRIEF DESCRIPTION OF THE DRAWING

Other features and advantages of the invention will be apparent from the following description taken in connection with the accompanying drawing wherein:

FIG. 1 is a fragmentary perspective view of a vacuum cleaner apparatus having a wheeled support structure embodying the invention;

FIG. 2 is a fragmentary enlarged vertical section taken substantially along the line 2—2 of FIG. 1;

FIG. 3 is a fragmentary vertical section taken substantially along the line 3—3 of FIG. 2; and FIG. 4 is a fragmentary vertical section taken substantially along the line 4—4 of FIG. 2.

DESCRIPTION OF THE PREFERRED EMBODIMENT

In the illustrative embodiment of the invention as disclosed in the drawing, a vacuum cleaner apparatus generally designated 10 is shown to comprise a canister-type vacuum cleaner having a canister 11 and a nozzle 12. The nozzle is connected to the canister by a flexible hose 13 and the wand 14 of the nozzle.

As indicated above, the invention comprehends the provision of improved wheeled support structure, such as wheeled support structure 15 illustrated in FIG. 1, for the body 16 of canister 11. The wheeled support structure 15 includes wheels 17 adapted to roll on the subjacent floor surface. As indicated above, the wheels are formed of a low elastic modulus material providing quieter and less marring or scratching movement over a subjacent bare floor surface, while being relatively inexpensive and providing long, troublefree life.

In the illustrated embodiment, as best seen in FIGS. 2-4, wheel 17 is snap-fitted to a wall portion 18 of the canister body.

More specifically, body wall portion, or wheel mount, 18 is formed with a recess 19 illustratively defined by a through bore having an inwardly facing annular lock surface 20. Bore 19 is defined by a tubular flange 21 extending axially outwardly from surface 20.

Wall portion 18 further defines a second axially outwardly projecting annular flange 22 spaced radially outwardly of flange 21 and defining a radially outer annular bearing surface 23.

Wheel 17 defines a central disc portion 24 provided with an axially inwardly projecting flange, or wheel support, 25 having a preselected inner diameter defined by radially inner mounting surface 25a thereof for providing a sliding fit of the distal end of flange 25 with bearing surface 23 in rotatably supporting the wheel on the wall portion 18.

The wheel further is provided with a resiliently deflectible latch element 26 extending inwardly through the recess 19 and defining at the distal inner end thereof, a latch shoulder 27 arranged to be disposed axially inwardly of the annular lock surface 20 for preventing axial outward removal of the latch element 26 from the recess. In the illustrated embodiment, latch element 26 comprises a tubular post extending coaxially inwardly from the center of disc 24 and provided with a diametric slot 28, thereby causing the latch shoulder 27 to define segmentally annular latching surfaces 29 facially confronting the locking surface 20 with the latch 26 inserted through recess 19, as shown in FIG. 2.

As further illustrated, wheel 17 defines a peripheral rim or tread 30 defining the running surface of the wheel. Disc portion 24 illustratively may be provided with a plurality of concentric ridges 41.

In the illustrated embodiment, wheel 17 is formed of a relatively soft synthetic resin, such as polypropylene. The mounting of the wheel by means of flange 25 on the relatively large diameter bearing surface 23 provides a high strength, rotatable mounting of the wheel to the canister body, while yet permitting the wheel to be formed as a one-piece unit from a relatively soft synthetic material.

The latch element 26 permits facilitated quick-snapped connection of the wheel to the canister body by virtue of the resilient characteristic of the material from which the wheel is formed, permitting the latch shoulders 27 to be urged resiliently inwardly as they are passed inwardly through the recess 19 to the latched disposition of FIG. 2.

As shown, the distal end surface 31 of the latch shoulder portions 27 is preferably frustoconical, narrowing inwardly so as to cam the latch shoulders radially inwardly in passing into recess 19, thereby further facilitating the quick fastening, snap-on assembly of the wheel to the canister body wall portion 18.

As further illustrated in FIG. 4, wheel 17 is provided with a plurality of radial ribs 32 for stiffening the rim portion 30 relative to the mounting flange 25. As seen in FIG. 2, body wall 18 may be provided with an offset portion 33, whereby the wheel is recessed partially into the wall portion 18.

Thus, in the illustrated embodiment, the bearing surface flange 22 is fixedly disposed on the wall portion 18 of the wheeled support structure 15 coaxially of recess 19. Rim 30 and wheel flange 25 cooperate through stiffening ribs 32 in providing a sturdy wheel construction, while yet permitting the wheel to be formed of a material, such as polypropylene having a relatively low elastic modulus. In the illustrated embodiment, the entire wheel structure 17 comprises a unitary integral element, and the entire wall portion 18 of the wheeled support structure comprises a unitary integral construction which illustratively may comprise a portion of the canister body 16.

The axial length of wheel flange 25 is preselected so that the distal end 34 thereof is juxtaposed to a confronting surface portion 35 of the wall 18, whereby the wheel mount wall 18 and wheel flange 25 define cooperating limit surfaces limiting the inward displacement of the latch element 26 through the recess 19 substantially to the disposition illustrated in FIG. 2, thereby effectively preventing undesirable axial displacement of the wheel on the wall portion 18 during running movement thereof in the use of the vacuum cleaner structure.

As indicated above, the provision of the wheel of relatively soft polypropylene or the like provides a nonmarring or scratching wheel tread, while yet the wheels and their related load-bearing surfaces have suitable strength for use in supporting the canister for rolling movement over a bare floor surface, such as floor F, as illustrated in FIG. 1.

The foregoing disclosure of specific embodiments is illustrative of the broad inventive concepts comprehended by the invention.

I claim:

1. For use in vacuum cleaners and the like having a body adapted to be moved over a floor surface, an improved wheeled support structure comprising:
    a wheel mount on the body defining an outwardly opening recess having an inwardly facing annular lock surface, and means defining an annular bearing surface coaxially of said recess; and
    a wheel having a resiliently deflectible latch element extending inwardly through said recess and having turned latch shoulder means arranged to be disposed inwardly of said annular lock surface for preventing axially outward removal of said latch element from said recess, and a wheel support defining an annular radially inwardly facing mounting surface slidably concentrically carried on said bearing surface.

2. The wheeled support structure of claim 1 wherein said bearing surface means is fixedly disposed on said wheel mount.

3. For use in vacuum cleaners and the like having a body adapted to be moved over a floor surface, an improved wheeled support structure comprising:
    a wheel mount on the body defining an outwardly opening recess having an inwardly facing annular lock surface, and means defining a fixed annular bearing surface coaxially of said recess; and
    a wheel having a resilient deflectible latch element extending inwardly through said recess and having turned latch shoulder means arranged to be disposed inwardly of said annular lock surface for preventing axially outward removal of said latch element from said recess, and a wheel support defining an annular radially inwardly facing mounting surface slidably concentrically carried on said bearing surface.

4. The wheeled support structure of claims 1 or 3 wherein said latch shoulder means is segmentally annular.

5. The wheeled support structure of claims 1 or 3 wherein the wheel mount structure defining said recess, lock surface, and bearing surface comprises a unitary integral structure.

6. The wheeled support structure of claims 1 or 3 wherein said wheel is formed of a synthetic resin having a hardness such as the hardness of polypropylene.

7. The wheeled support structure of claims 1 or 3 wherein said wheel is formed of a material having a hardness such as the hardness of polypropylene.

8. The wheeled support structure of claims 1 or 3 wherein said wheel is formed of polypropylene.

9. The wheeled support structure of claims 1 or 3 wherein said latch element has a preselected clearance with said wheel mount in said recess.

10. The wheeled support structure of claims 1 or 3 wherein said wheel mount recess comprises a through bore.

11. The wheeled support structure of claims 1 or 3 wherein said wheel mount is formed integrally with said body.

12. The wheeled support structure of claims 1 or 3 wherein said wheel support is formed integrally with said wheel.

13. The wheeled support structure of claims 1 or 3 wherein said wheel support is spaced radially outwardly from said latch element.

14. The wheeled support structure of claims 1 or 3 wherein said wheel mount and said wheel support define cooperating limit surfaces limiting the inward displacement of said latch element in said recess.

* * * * *